(12) United States Patent
Zellner et al.

(10) Patent No.: US 11,429,621 B2
(45) Date of Patent: Aug. 30, 2022

(54) FACILITATION OF A CROSS-SERVER EXTENSION

(71) Applicant: AT&T Intellectual Property I, L.P., Atlanta, GA (US)

(72) Inventors: Samuel N Zellner, Atlanta, GA (US); Mahesh Maan, Mohali (IN); Anirudh, Jammu (IN)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 121 days.

(21) Appl. No.: 17/080,108

(22) Filed: Oct. 26, 2020

(65) Prior Publication Data

US 2022/0129471 A1    Apr. 28, 2022

(51) Int. Cl.
*G06F 16/2457* (2019.01)
*G06N 3/08* (2006.01)
*G06F 16/93* (2019.01)

(52) U.S. Cl.
CPC ........ *G06F 16/24578* (2019.01); *G06F 16/93* (2019.01); *G06N 3/08* (2013.01)

(58) Field of Classification Search
CPC .............. G06F 16/24578; G06F 16/93; G06F 16/2457; G06F 16/25; G06F 16/27; G06F 16/256; G06F 16/33; G06N 3/08; G06N 20/00
See application file for complete search history.

(56) References Cited

U.S. PATENT DOCUMENTS

2017/0235788 A1* 8/2017 Borisyuk ............ G06F 16/2272
                                                            707/723
2019/0251422 A1* 8/2019 Ramanath ......... G06F 16/24578

OTHER PUBLICATIONS

Reimers et al. "Sentence-BERT:SentenceEmbeddingsusingSiameseBERT-Networks" Proceedings of the 2019 Conference on Empirical Methods in Natural Language Processing and the 9th International Joint Conference on Natural Language Processing, pp. 3982-3992, Nov. 2019, 11 pages.
Flask API "Flask API Browsable Web APIs for Flask" https://www.flaskapi.org/, Last Accessed Dec. 4, 2020, 5 pages.
"spotify / annoy" GitHub, https://github.com/spotify/annoy, Last Accessed Dec. 4, 2020, 9 pages.

(Continued)

*Primary Examiner* — Hau H Hoang
(74) *Attorney, Agent, or Firm* — Amin, Turocy & Watson, LLP

(57) ABSTRACT

Servers at different locations and storing different data can be designed such that one server can act as an extension of the other server by accepting search queries from the other server and returning a response. The response can also comprise results, from the querying server, from within its own document collection. The other server can then include in its response to its user's queries, results obtained from its extension. One or more of the servers can act as an aggregation server that aggregates data from other servers before sending the data to a querying device or server. Additionally, the aggregation server can modify, add, or delete information from the results, before sending to the querying device, based on previous rules and/or properties associated with the aggregation server.

20 Claims, 10 Drawing Sheets

(56) References Cited

OTHER PUBLICATIONS

"facebookresearch / faiss" GitHub, https://github.com/facebookresearch/faiss, Last Accessed Dec. 4, 2020, 5 pages.
Dai et al. "Convolutional Neural Networks for Soft-Matching N-Grams in Ad-hoc Search" WSDM'18, Feb. 5-9, 2018, Marina Del Rey, CA, USA, 9 pages.
Jang et al. "A Study of Match Pyramid Models on Ad-hoc Retrieval" arXiv:1606.04648v1 [cs.IR] Jun. 15, 2016, 5 pages.
"K Keras" K Keras, https://keras.io/, Last Accssed Dec. 4, 2020, 3 pages.
"UKPLab / sentence-transformers" GitHub, https://github.com/UKPLab/sentence-transformers, Last Accessed Dec. 4, 2020, 7 pages.
"stanfordnlp / GloVe" GitHub, https://github.com/stanfordnlp/GloVe, Last Accessed Dec. 4, 2020, 4 pages.
Pennington et al. "GloVe: Global Vectors for Word Representation" Proceedings of the 2014 Conference on Empirical Methods in Natural Language Processing (EMNLP), pp. 1532-1543, Oct. 25-29, 2014, 12 pages.
"PAQI" PQAI, https://about.projectpq.ai/, Last Acceseed Dec. 4, 2020, 5 pages.

* cited by examiner

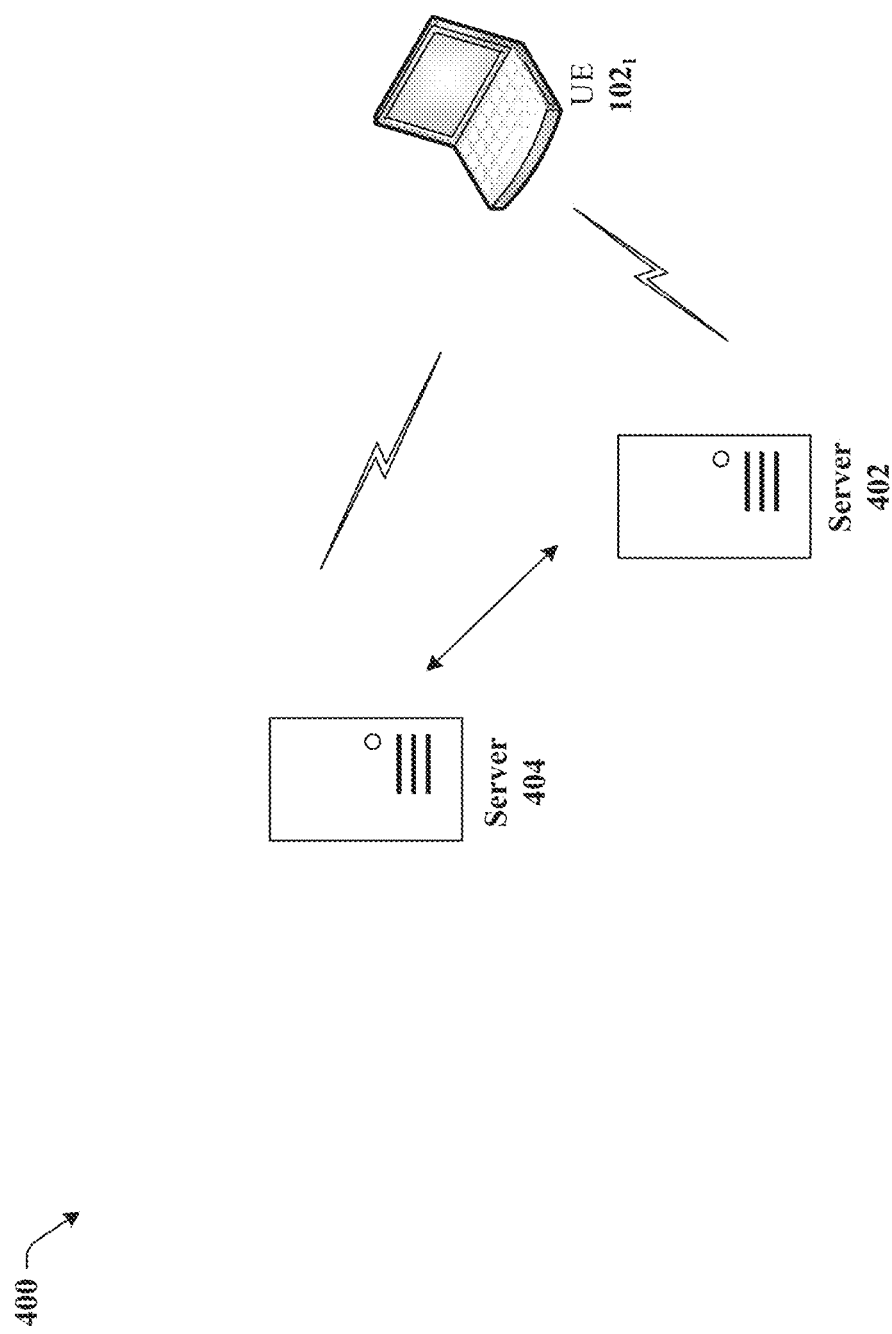

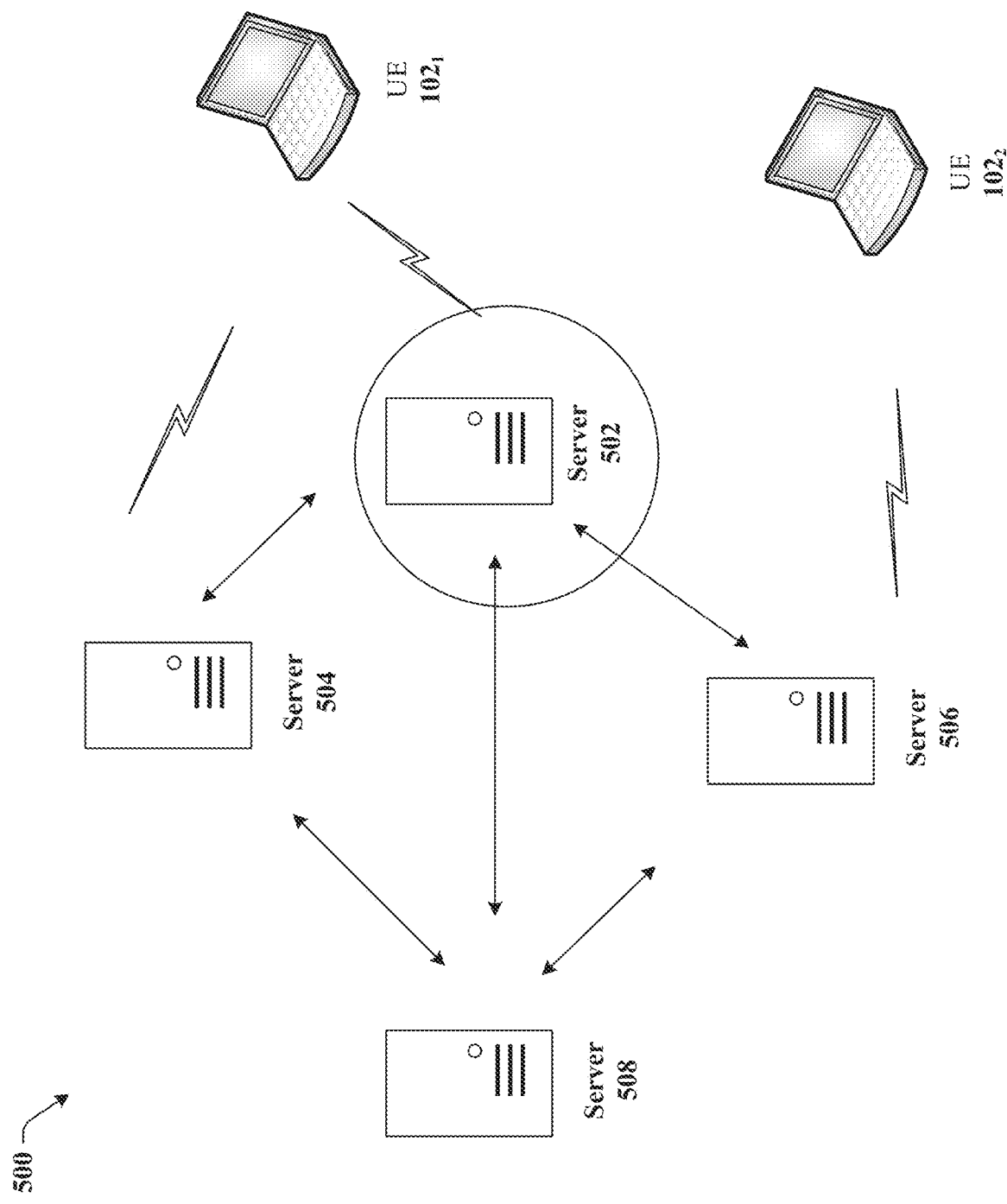

600 receiving, by a first server comprising a processor from a user equipment, search request data representative of a search request for retrieving a document in accordance with a query, wherein the search request data comprises user equipment identification data that identifies the user equipment

↓ 602 modifying, by the first server, the search request data, resulting in modified search request data, wherein the modified search request data comprises destination data representative of servers for the modified search request data to be sent based on the user equipment identification data and a configuration of the first server, and wherein modifying the search request data comprises modifying text data to vector data generated by a neural network shared by the first server, a second server, and a third server

↓ 604 in response to modifying the search request data, sending, by the first server, the modified search request data to the second server and the third server

↓ 606 receiving, by the first server, first search results and first ranking data from the second server and second search results and second ranking data from the third server

↓ 608 in response to receiving the first search results the second search results, aggregating, by the first server, the first search results and the second search results based on the first ranking data and the second ranking data, resulting in aggregated search results

↓ 610 based on relationship between the aggregated search results, reducing, by the first server, the aggregated search results to a limited number of the aggregated search results

↓ 612 populating, by the first server, an information disclosure form with the limited number of the results

↓ 614 in response to populating the information disclosure form, sending, by the first server, the information disclosure form to the user equipment

FIG. 6

```
                                                                          700
┌─────────────────────────────────────────────────────────────────────────┐
│ receiving, from a user equipment, search request data representative of a search request for │
│ a document to be associated with a query, wherein the search request data comprises user    │
│ equipment identification data that identifies the user equipment                             │
└─────────────────────────────────────────────────────────────────────────┘
                                      │
                                      ▼                                   702
┌─────────────────────────────────────────────────────────────────────────┐
│ in response to receiving the search request data, modifying the search request data,         │
│ resulting in modified search request data, wherein the modified search request data          │
│ comprises destination data representative of servers for the modified search request data to │
│ be sent, and wherein the modified search request data comprises language translation data    │
│ to facilitate the servers searching via a different language than a language of the search   │
│ request                                                                                       │
└─────────────────────────────────────────────────────────────────────────┘
                                      │
                                      ▼                                   704
┌─────────────────────────────────────────────────────────────────────────┐
│ in response to modifying the search request data and based on a permission status of the    │
│ user equipment, sending the modified search request data to a first server of the servers   │
└─────────────────────────────────────────────────────────────────────────┘
                                      │
                                      ▼                                   706
┌─────────────────────────────────────────────────────────────────────────┐
│ in response to sending the modified search request data to the first server, receiving first │
│ search results and a first rank value associated with the first search results from the first│
│ server                                                                                        │
└─────────────────────────────────────────────────────────────────────────┘
                                      │
                                      ▼                                   708
┌─────────────────────────────────────────────────────────────────────────┐
│ receiving second search results and a second rank value associated with the second search    │
│ results from a second server                                                                  │
└─────────────────────────────────────────────────────────────────────────┘
                                      │
                                      ▼                                   710
┌─────────────────────────────────────────────────────────────────────────┐
│ in response to receiving the first search results and the second search results, aggregating │
│ the first search results and the second search results based on the first rank value and the │
│ second rank value, resulting in aggregated search results                                     │
└─────────────────────────────────────────────────────────────────────────┘
                                      │
                                      ▼                                   712
┌─────────────────────────────────────────────────────────────────────────┐
│ based on relationship between the first search results and the second search results,        │
│ reducing, by the first server, the aggregated search results to reduced search results       │
└─────────────────────────────────────────────────────────────────────────┘
                                      │
                                      ▼                                   714
┌─────────────────────────────────────────────────────────────────────────┐
│ in response to reducing the aggregated search results, populating an information disclosure  │
│ form with the reduce search results                                                           │
└─────────────────────────────────────────────────────────────────────────┘
                                      │
                                      ▼                                   716
┌─────────────────────────────────────────────────────────────────────────┐
│ in response to populating the information disclosure form, transmitting the information      │
│ disclosure form to the user equipment                                                         │
└─────────────────────────────────────────────────────────────────────────┘
```

FIG. 7

```
                                                                           800
┌──────────────────────────────────────────────────────────────────────────────┐
│ receiving, from a user equipment, search request data representative of a search request to │
│ be performed, wherein the search request data comprises user equipment identification data │
│ indicative of the user equipment                                             │
└──────────────────────────────────────────────────────────────────────────────┘
                                        ▼                                  802
┌──────────────────────────────────────────────────────────────────────────────┐
│ in response to receiving the search request data, altering the search request data, resulting │
│ in altered search request data, wherein the altered search request data comprises destination │
│ data representative of a first server for the altered search request data to be sent, vector data │
│ generated by a neural network shared by the first server and a second server, and language │
│ translation data to facilitate the first server and the second server searching via a different │
│ language than a language of the search request                               │
└──────────────────────────────────────────────────────────────────────────────┘
                                        ▼                                  804
┌──────────────────────────────────────────────────────────────────────────────┐
│ in response to altering the search request data and based on a permission status of the user │
│ equipment, sending the altered search request data to the first server and the second server │
└──────────────────────────────────────────────────────────────────────────────┘
                                        ▼                                  806
┌──────────────────────────────────────────────────────────────────────────────┐
│ in response to sending the altered search request data to the first server and the second │
│ server, receiving a first search result and a rank value of the first search result from the first │
│ server and a second search result and a second rank value of the second search result from │
│ the second server                                                            │
└──────────────────────────────────────────────────────────────────────────────┘
                                        ▼                                  808
┌──────────────────────────────────────────────────────────────────────────────┐
│ in response to receiving the first search result and the second search result, combining the │
│ first search result and the second search result based on the first rank value and the second │
│ rank value, resulting in combined search results                             │
└──────────────────────────────────────────────────────────────────────────────┘
                                        ▼                                  810
┌──────────────────────────────────────────────────────────────────────────────┐
│ based on relationship between the combined search results, reducing the combined search │
│ results to a reduced search result less than the combined search result      │
└──────────────────────────────────────────────────────────────────────────────┘
                                        ▼                                  812
┌──────────────────────────────────────────────────────────────────────────────┐
│ populating an information disclosure statement form with the reduced result  │
└──────────────────────────────────────────────────────────────────────────────┘
                                        ▼                                  814
┌──────────────────────────────────────────────────────────────────────────────┐
│ in response to populating the information disclosure statement form, sending the │
│ information disclosure statement form to the user equipment                  │
└──────────────────────────────────────────────────────────────────────────────┘
```

FIG. 8

FACILITATION OF A CROSS-SERVER EXTENSION

TECHNICAL FIELD

This disclosure relates generally to facilitating a cross-server extension. For example, this disclosure relates to facilitating a cross-server extension for a document retrieval serverdistributed architecture for patent quality artificial intelligence.

BACKGROUND

A server is a piece of computer hardware or software that provides functionality for other programs or devices, called "clients". This architecture is called the client-server model. Servers can provide various functionalities, often called "services", such as sharing data or resources among multiple clients, or performing computation for a client. A single server can serve multiple clients, and a single client can use multiple servers. A client process may run on the same device or may connect over a network to a server on a different device. Typical servers are database servers, file servers, mail servers, print servers, web servers, game servers, and application servers.

Client-server systems are can be implemented by a request-response model meaning that a client sends a request to the server, which performs some action and sends a response back to the client, typically with a result or acknowledgment. Designating a computer as "server-class hardware" implies that it is specialized for running servers on it. This often implies that it is more powerful and reliable than standard personal computers, but alternatively, large computing clusters may be composed of many relatively simple, replaceable server components.

The above-described background relating to facilitating cross-server extension is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 4 illustrates an example a patent quality artificial intelligence server system in one or more embodiments. according to one or more embodiments.

FIG. 5 illustrates an example schematic system block diagram of a server architecture according to one or more embodiments.

FIG. 6 illustrates an example flow diagram for method for a server extension system according to one or more embodiments.

FIG. 7 illustrates an example flow diagram for a system for server extension system according to one or more embodiments.

FIG. 8 illustrates an example flow diagram for machine-readable medium for a server extension system according to one or more embodiments.

DETAILED DESCRIPTION

Figure 1:
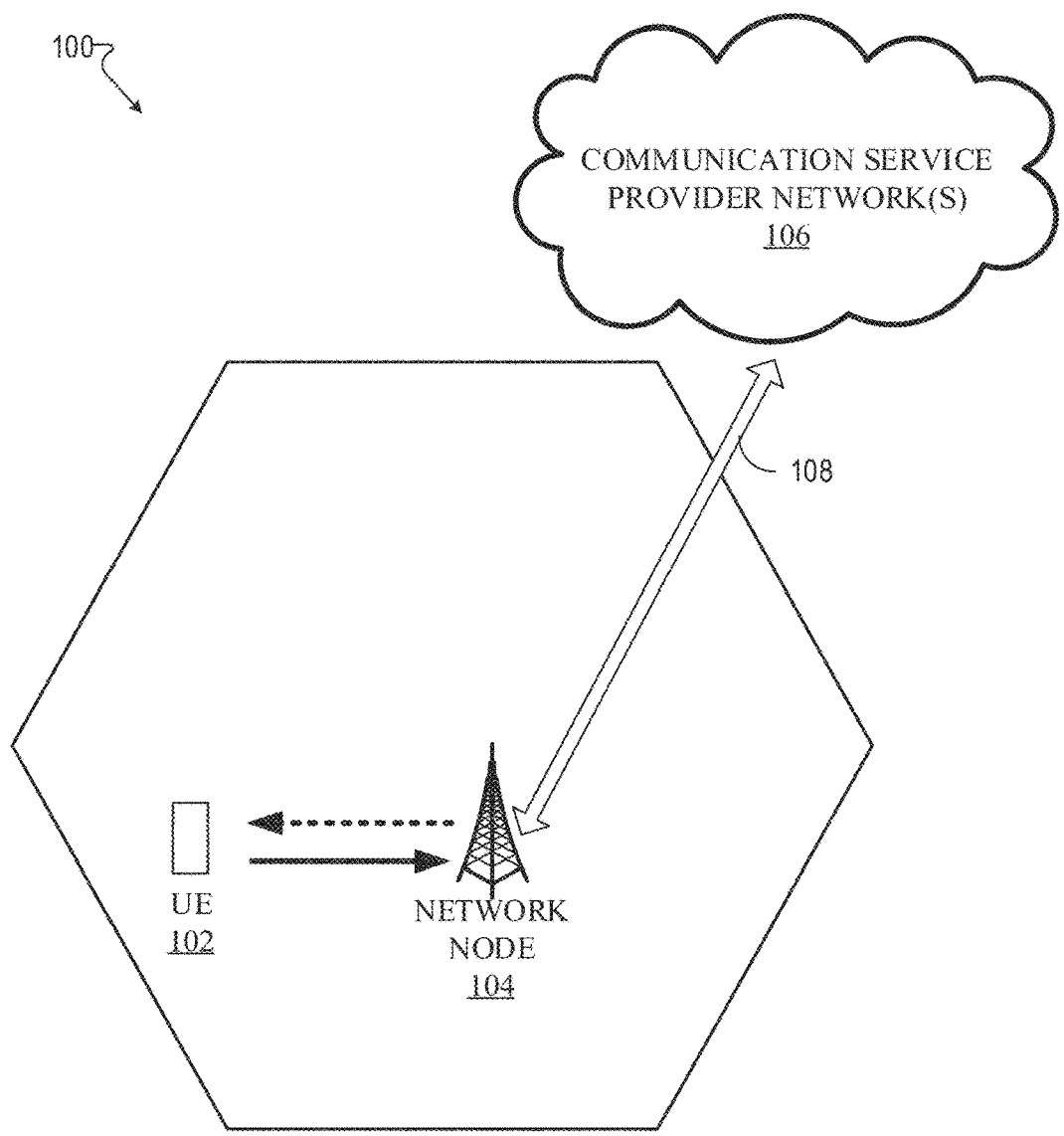
FIG. 1 illustrates an example wireless communication system in which network equipment (e.g., a network node device, or a network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate a cross-server extension between mobile devices and network devices.

For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium or a machine-readable storage medium.

It is noted that although various aspects and embodiments are discussed herein with respect to Universal Mobile Telecommunications System (UMTS) and/or Long Term Evolution (LTE), the disclosed aspects are not limited to a UMTS implementation and/or an LTE implementation. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.10 technology. Additionally, substantially all aspects disclosed herein can be exploited in legacy telecommunication technologies.

Described herein are systems, methods, articles of manufacture, and other embodiments or implementations that can facilitate cross-server extension. Facilitating cross-server extension can be implemented in connection with any type of device with a connection to the communications network such as: a mobile handset, a computer, a handheld device, or the like.

Search technology is an integral part of modern life. It helps people find information, which can take a variety of forms ranging from a list of nearby restaurants to a relevant paragraph from an obscure book. In a typical usage scenario, users describe their information needs by typing in a text query on a digital device such as a desktop computer or a mobile phone. The query is then sent to a retrieval server over a computer network. The retrieval server stores relevant information items (e.g., documents, along with relevant computer programs for matching the user's query with the information items to select a subset of items that are likely to satisfy the user's information need). The selected items, commonly called search results, are then transmitted back to the user's device, where they are presented to the user.

The current disclosure can provide an information search system that facilitates retrieval of information stored on multiple and/or geographically distant information retrieval servers in a unified manner. The information search system can facilitate retrieval of information stored in publicly and privately accessible information repositories in a unified manner and retrieve information from free and paid information retrieval servers in a unified manner. The information search system can facilitate retrieval of information from multiple information retrieval servers that use different search algorithms that are not inter-compatible and retrieve information in a language different than the language of the input query without relying on the conventional approach of running a search on translated versions of literature. Additionally, the information search system can facilitate retrieval of information from multiple information retrieval servers that store partially overlapping information repositories and enable effective and efficient information retrieval from fast-evolving information repositories while retrieving information from multiple information retrieval servers in a way that enhances security and privacy.

Information retrieval (IR) servers, which can be situated at different geographical locations and carry exclusive or partially overlapping information items, can be designed such that one can act as an 'extension' of another by accepting search queries from the other IR servers and returning, in response, whatever search results it finds from within its own collection of information items. The other IR server can then include in its response to its user's queries, the aforementioned search results obtained from the extension server. To the user, this process would be transparent—it would feel as if all information items obtained in the response are available on the same server. Such a system can be useful, for instance, in a corporate setting where a company has its own private document repository on a private, on-site IR server. When a company's employee submits a search query to the on-site IR server, not only can they see the results from a private, in-house repository but also from a public IR server that has been configured to act as an extension to it, and which stores publicly available information items, (e.g., patent documents). This would obviate the need to run the same search query on two different IR servers.

The following is a description of the steps that an exemplary IR server can take to obtain the search results. A search module of the IR server can receive a search request from a user's device, where the search request can contain the user query and search filters, (e.g. cutoff dates). Another module of the IR server, called the representation module, can then encode the query into a representation more suitable for matching with the information elements. In one embodiment, the representation can be a distributed representation, (e.g., a query vector) or a sequence of tokens (e.g. words). After this step, the information retrieval server can optionally use another module to select a subset of the information elements against which the query's representation is to be matched. When the information elements are patent documents, this module can take the form of a subclass prediction module, which associates one or more subclasses to a query, which can then be used to select indexes that are to be searched. The indexes contain representations of information elements. In another embodiment, the indexes can contain document vectors. Then the IR server can use an index module to search the selected indexes with the query representation. Each of the searched indexes can yield a list of results, where each result can be associated with a numerical or categorical score value that is indicative of the extent to which the results are likely to satisfy the user's query. Therefore, the IR server can merge the results obtained from various indexes and sort them by their scores. The IR server can then use the database module to extract the bibliography details of each of the search results, then apply the search filters on the results to select a subset of results that satisfy the search filters. The IR server can also use a snippet extraction module to extract one or more snippets for each result. The IR server can thus create a final result set and transmit it back to the user's device over a computer network.

The representation module described above can ingest a document, such as a patent document, or a query and transform it into a representation that is more effective to be used for information retrieval. A more effective representation may, for instance, reduce the time or computation required to retrieve the search results or may find search results that are more relevant, (e.g., which satisfy the user's query to a greater extent). The representation module can make use of a number of different possible representations such as, but not limited to, a bag of words, a sequence of words, vectors, sequences or sets of vectors.

The representation module can use a number of techniques to convert a given information item into its corresponding representation. In some embodiments, the representation module can use a neural-network based model trained using supervised machine learning to convert an information item into a vector, a set of vectors, and/or a sequence of vectors. In some embodiments, the representation module can use a pretrained neural network model for creating the representation of information items. One possible neural network model suitable to be used by the representation module could, for instance, be a bi-directional encoder representation from transformers (BERT) based model, called Sentence BERT (e.g., sentence embeddings using Siamese BERT-networks). In some embodiments the pretrained neural network model can be fine-tuned on data comprising same or similar information elements as stored by the IR server. For instance, the neural network model can be fine-tuned on a citation prediction task in a supervised manner. Such a fine-tuning can increase the relevancy of the search results. Other embodiments can use representation techniques other than Sentence BERT, as have been listed in Table 1. Table 1 also shows the accuracy of the various representation techniques on a patent-citation prediction task.

TABLE 1

Performance of various vectorizers

| Vectorizer | Field | Accuracy | Vector similarity |
|---|---|---|---|
| Averaged GloVe vectors | First sentence | 0.2442 | Cosine proximity |
| Averaged GloVe vectors | Title | 0.2623 | Cosine proximity |
| Averaged GloVe vectors | Abstract | 0.2956 | Cosine proximity |
| SIF weighted GloVe vectors | First sentence | 0.2762 | Cosine proximity |
| SIF weighted GloVe vectors | Title | 0.2969 | Cosine proximity |
| SIF weighted GloVe vectors | Abstract | 0.3274 | Cosine proximity |
| SIF weighted GloVe vectors + CPC Embeddings | First sentence | 0.2878 | Cosine proximity |
| SIF weighted GloVe vectors + CPC Embeddings | Title | 0.2983 | Cosine proximity |
| SIF weighted GloVe vectors + CPC Embeddings | Abstract | 0.3261 | Cosine proximity |
| GRU based encoder decoder (without attention) | Abstract | 0.2836 | Euclidean distance |
| Sent-BERT (STS) | Abstract | 0.3180 | Cosine proximity |
| Sent-BERT (STS + PoC) | Abstract | 0.3329 | Cosine proximity |
| Conv-KNRM | Abstract | 0.3625 | — |
| MatchPyramid | Abstract | 0.3515 | — |

To speed-up the search during run-time, the index module can store precomputed representations of every information element available in the database of the IR server. For further speed-up in embodiments where a vector representation is used by the IR server, an approximate nearest neighbor search technique can be adopted. For further speed-up, in some embodiments, particularly when information elements can be classified into multiple categories on the basis of their inter-similarities or differences, multiple indexes can be created, each containing the representation of a subset of the information elements. In such embodiments where multiple indexes are created and stored, an index selection module can be used, at runtime, to select a subset of indexes that are likely to contain representations of information elements that are likely to satisfy the user's query.

The index selection module can be a neural network, which, given an information element or a query, predicts the probabilities of it being associated with various index categories through a softmax output layer. When the information elements are patents, for instance, these categories can correspond to CPC subclasses, which contain patents related to different technologies. In some embodiments, this neural network can treat a given text as a bag of words and can be trained to predict, given a patent's field such as its title, abstract, preamble, claim, or even full description, the most frequently occurring CPC subclass among its citations. A neural network trained in this manner can be termed as a subclass prediction module.

A subclass prediction module can be used in two ways. The first is that during index creation, it is used to assign CPC subclasses to non-patent documents, such as research papers, which unlike patents, do not have any global classification information associated with them. Thus, the subclass prediction module can be used to assign a CPC subclass to it. Documents belonging to a subclass can be indexed together into one index file. Additionally, during runtime, this module can be used to select a subset of indexes, each corresponding to a specific subclass, that is to be searched for a given user query.

The snippet extraction module can extract sentences from the full-text of the patent that are shown to the user along with the bibliography of the result. If the user query is composed of multiple "features" delimited, for instance, with newline characters, a snippet corresponding to each feature can be extracted to create an element-wise mapping.

Two IR servers can also act as extensions of each other such that sending a search request to any one of them brings back results from both of the IR servers. Such an extension can be useful for numerous reasons. One use of extension servers would be for scaling, where the number of information elements over which the search needs to be carried is too great for one server to search within a given query processing time constraint. Another use could be to link two ever-evolving data repositories located on geographically distant servers, say one repository corresponding to documents generated by a company's U.S. office and another corresponding to the company's Australia office, which need to be searched together. It can also connect a number of such data repositories. For example, all open-access research journal publishers, each having an IR server in accordance with the present invention, can be linked together, so that a single query can 'propagate' on the network of these IR servers and the queried IR server can collate the results together and return a final set of results to the user.

Such a network of IR servers can obviate the need to collate the data from multiple publishers in one place (e.g., at one IR server) to provide users with the capability to receive comprehensive search results with a single submission of the query. This can be even more advantageous for cases where new documents are pushed to the repositories frequently. For instance, various patent offices can be deployed on their own IR servers in accordance with the present disclosure and all new patents and patent applications to these servers as soon as they are issued or published. This would make the patent data accessible worldwide in real-time.

Another advantage of the present disclosure is that it can provide a unified search platform that will make it easier for users to find relevant information even if it is published on different sources. Universities, for instance, subscribe to multiple research publishers (e.g., IEEE, Elsevier) which provide their own search interfaces and functionalities. The university also publishes documents (e.g., masters and PhD theses) to its own repositories. Deploying an IR server for these research publications and buying 'subscriptions' of the publishers' IR servers to act as an extension to the university's IR server could simplify things greatly. Some publishers may also provide public access to bibliographic data (a public IR server) of their research papers whereas paid access to the full text can be hosted in other repositories (e.g., a private IR server requiring an authentication token).

The IR server can host a configuration file. The configuration file can be a text file containing a number of configurations, also commonly called settings. The IR server can read these settings to understand its environment when it is booted. For example, this file can tell the IR server how to connect to the database where the information elements are stored and the specifics of the vector indexes.

The configuration file can also contain an extension configuration. The extension configuration can comprise a list of API endpoints, which may correspond to remote IR servers from which this server is supposed to collect search results (along with, in some embodiments, searching its own documents)—thus configuring the IR servers corresponding to the API endpoints as the extensions of this server. There can be another configuration, say 'outgoing extensions enabled' that allows/disallows outgoing extension requests. This configuration can assume a binary value. The extension function of the IR server would not work if this configuration has been set to false, even if the extension configuration has a list of remote endpoints. The purpose of this configuration is to allow easy activation or deactivation of the extensions feature without the need to modify (the more complex) extension configurations. It can also assist during troubleshooting in production servers.

In some embodiments, the configuration file may not be visible to the end-users. This is useful for cases where it is desired that users not be able to obtain results from arbitrary IR servers. Only system admins, (e.g., who are deploying an IR server) or other admins who have write access to the server's code can change the configuration file in such embodiments. When the IR server boots up, it can read the configuration file and initializes its operation according to the settings found therein. When it reads the extensions setting, it can check whether any remote servers are listed therein. If a list is found, the server knows which other IR servers can be used as its extensions.

If the outgoing extensions enabled configuration is enabled, an IR server can request all of the extensions endpoints to return results for all the queries that it gets from its users. To send these requests and to obtain, process, and merge the results from these different servers with its own results, another module, named 'remote' can be used.

The remote module can perform 3 tasks. The first task is that it can receive a query and a list of remote IR servers on which the query is to be executed. Then, it can create an HTTP request of a predefined format and send it to each of the the remote IR servers known to it as extensions. Then, it can obtain the responses from each of these remote servers and unwrap the responses to obtain the search results. Next, the remote module can merge all the results obtained from the remote IR servers to create one list of merged results. During the merging, it can also check and remove duplicate results (since two servers may contain the same information elements). After merging the search results, the remote module can sort them according to similarity scores associated with each search result. After this step, it would appear as if the search result set was generated by a single IR server that contained all the information elements corresponding to the results. The result set returned by the 'remote' module can then be merged and sorted similarly with the local search results obtained by the current IR server to obtain a final results list, which can then be returned to the user.

The IR server can request other IR servers to run its queries. The IR server can also accept search requests from other IR servers. This latter behavior can be controlled by another configuration in the configuration file, called 'incoming extensions enabled'. When this configuration is enabled, the IR server can accept search requests from other IR servers and respond appropriately with the search results corresponding to the search queries and search filters contained in those search requests. To listen to such requests, the IR server can have a dedicated route, called /extension/.

The /extension/ route can listen for requests from other IR servers when the incoming requests are enabled in the configuration file by setting the 'incoming extensions enabled' configuration to true. If this setting is set to false, (e.g., disabled) then the IR server would not respond to any search requests from other IR servers.

For privacy or other reasons, it may be desired to obtain search results from an IR extension server without sending the query explicitly to it. In such a scenario, an encoded representation of the query, instead of the original search query obtained from the user, can be sent to the extension. This representation, in some embodiments, could be a real-valued vector, also called a distributed representation of the query, which can be used to perform the search in a vector index but difficult to decode back to the original query. When such a representation is transmitted to an extension server, the query representation can be compatible with the representation used by the extension server for its information elements, e.g., documents. This can be done in multiple ways: (a) by sending, along with the query representation, data that specifies how the representation was created (e.g., if it was created by a neural network model), and then identification of the model (e.g., model ID and version number) so that the extension server can verify compatibility, and/or (b) sending pairs of arbitrary information elements, e.g., text and their corresponding representations—with which the extension server can verify its compatibility. In other embodiments a maximum number of document results can be sent to queried information retrieval servers. The search results can be ranked and a limited number of the ranked results can be presented. For example, a threshold value can be set such that only the top ten results can be presented based on their rank. The limited results can be selected based on their overall relatedness, clusters of related technologies, and/or a number of documents can be presented from each cluster (e.g., 3 documents from art unit A, 3 from art unit B and 4 from art unit C). Different information retrieval search engines can be used based on the technology, and in the case of a 103 search, the query may involve breaking the concept into sub elements and utilizing different information retrieval search engines based on the technology of each element. The search scope can also be limited based on an "obviousness criteria" (e.g., limit the search to a specific art unit). User profile privileges can be used to determine which information retrieval servers are accessible to a specific user. Data associated with calculating fees can also be used collected based on accessing a specific search engine, accessing a search engine and getting results above some threshold (e.g., this search engine database had relevant results otherwise no charge), and/or requesting the full document after seeing the search results.

In some embodiments, the text query might not be transmitted even to the IR server from the user's device. A model residing on the user's device (e.g., within the browser, or in a browser extension) can create a representation of the query and send it to the IR server. Multiple representations of the query, compatible with various extension servers may also be transmitted. The representations can be language-independent, (e.g., created by a model that would create the same or similar representation when given as input, two pieces of text that are in different languages but semantically similar). Using language-independent representations can allow cross-lingual information elements to be found (e.g., German document for an English query).

In an alternative embodiment, while creating the representation from a text query, some information can be withheld from being included into the representation. The withheld information may, for example, be the low-level granular details of a query, (e.g., low-level details of an invention when searching for prior-art of patents). The representation, thus obtained, can then contain that information which is required to find 'roughly' relevant information elements from the extension servers. The IR server may then re-rank the results obtained from the extension servers by using the complete query information. Such a re-ranking would comprise associating new relevancy scores to each result by a matching operation of the search result with the complete query information. The re-ranking can also be done within a browser in embodiments where the representation is created within the browser.

A search request can be sent from a browser, a desktop, or mobile app to a first search server. The search request can comprise a query, which can be in the form of text, an image, a vector, a sequence of vectors, or any other representation that contains info about the user's need. The query representation can be cross-lingual, e.g., a vector generated by a neural language model which encodes texts from multiple languages into the same embedding space, also called vector space (e.g., the word rabbit has the same or very similar vector for the word Kaninshen which is also rabbit but in German). The query representation can be cross-modal (e.g., a vector generated by a neural network that embeds text and images in the same embedding space). For example, images of cats and the word 'cat' embedded in close proximity and can thus be used to search image databases as well as text databases with the same vector. The search request can contain search filters besides the query (e.g., date filters (before and after cutoff dates), document type filters (patent, design and/or utility, non-patent docs, etc.), document metadata filters (e.g., assignees, etc.)). The search request can contain an indication (e.g., a list) of servers to which this search request can be forwarded by an interim server. The indication can be a direct result of preferences made explicitly by the user (e.g., users select a list of servers they trust or need results from) or a configuration preset by an admin of the web-app (e.g., the IT department of a company decides which servers are trusted). The search request can contain identification information of the computer from which it has been originated. This information should be sufficient to identify the computer uniquely on a network. Its purpose is to allow a server to send its response directly to the originating computer (instead of or in addition to sending a response to an interim server from which the forwarded request is received by the server that is to respond). The first search server can be a public server (accessible by anyone) or a private server (on a private network—a company's internal network, and accessible through or without authentication). The first search server may or may not have any data on it (e.g., it need not necessarily do any search). It can simply act as a proxy for forwarding the incoming search requests to other search servers.

The search request can then be forwarded from the first search server to few other search servers. The first search server can modify the search request by changing the representation of the query it contains (e.g., by changing the representation of the query from text to a vector). It can also change the search filters. The first search server can also remove some information from the search request. For instance, if the query contains a full invention description (e.g., in a prior-art search system), the first search server can remove part of it through omission of some of the explicit information or creating a shortened summary that omits some of the details of the invention. The first search server can even change the modality of the query. For instance, if the query contains an image uploaded by the user for a design search, the first search server can replace the image with a piece of text that describes the design (e.g., replace the image of a water bottle with the textual phrase 'water bottle'). The text could be generated directly by identifying the objects in the images or by processing of the metadata (e.g. subtitles) associated with the similar images in the first search server's database. The first search server can add additional information in the search request before forwarding it (as a forwarded search request) to the other servers. The additional information can specify the destination to which the other servers should return the search results. The destination could be the first server itself, the computer from which the search request was generated, or it could even be another server (e.g., an aggregator server). The additional information can identify specific search algorithms (e.g., machine learning models) and their versions that should be used for serving to this search request. The other search servers would then use the specified algorithms while searching. This is important because different search algorithms would typically assign different numerical scores to a given search result. This creates problems in merging the results from different servers into a coherent result list ranked according to the numerical scores, since a result with numerical score of 2.23 from one algorithm can be less relevant than a result with a numerical score of 1.35 from another algorithm. Therefore, to merge results, it is not necessary, that the relevancy varies monotonously with the numerical score.

As an alternative to specifying the search algorithms by name and versions, the forwarded search request can contain information that can be used to verify (or select) a compatible search algorithm. This can be done in multiple ways. For instance, one could be through the use of exemplary query-result pairs from dummy databases, identical copies of which are accessible to the first server as well as other search servers. Another way could be by including in the search request, sample raw data (e.g., text or image) and its representation, where the representation is generated by the search algorithm (or a part of it, e.g., representations module). This transformation of raw data into a representation can act as a fingerprint of the algorithm. The additional information can be additional and different representations of the query, which can be compatible with different search algorithms. The additional information can specify whether the other servers can further forward the forwarded search request or not. This is to avoid having the search request sent to an untrusted server. This information can allow, explicitly or implicitly, re-forwarding the forwarded search request to servers that are acting as the other server's load-balancers (e.g., with which the search server is forming a compute cluster). The additional info can uniquely identify the first search server. This is important because if re-forwarding is enabled, then other servers can use this information and refrain from re-forwarding the same request to this first search server, hence avoiding infinite loops. The first search server may not necessarily need to rely on the indication in incoming search requests to decide to which other servers it can forward the search request. This is useful in embodiments where the search request does not contain any such indication and it is left to the configuration of the first search server to decide whether and where to forward this search request. The search request can be forwarded to the other search servers before the first search server begins performing the search on its own collection of information elements.

Each server can perform the search as per the search request's parameters and obtain a list of results and formats, the results in the form of a response suitable for transmitting back. Each result can carry an associated numerical score with it in the response. Each of the results can have associated information identifying the search server and the database from which the result came. Additionally, the result can carry associated information aimed to depict the relevancy of the result to the user. For example, in the case of a text search, the associated information can be one or more snippets of text, while in the case of image search, it could be one or more images, in full, in part, or a full image with a portion highlighted (e.g., with a red rectangle). Each result can carry associated metadata, (e.g., its publication number, publication date, authors, a web URL for full access to it, etc.). The result can also carry a complete copy of the item (e.g., document) associated with it and/or information indicating the algorithm and/or model and any parameters used to find this result.

The servers can then transmit back their respective responses containing the search results to an aggregator. The aggregator can be specified in the search request, but if not, the results can be sent back to the same server (or the originating computer in case it is the first search server) from which the search request was obtained. It should be noted that the aggregator can be the device that made the original search request, (e.g., the user's computer). The aggregator merges the results. For example, the aggregator can merge the results on the basis of the numerical scores associated with the results (e.g., ascending or descending) and/or the aggregator can merge the results on the basis of a new numerical score, calculated by the aggregator, by using a search algorithm different from one or more of the algorithms used by the search servers for getting the results. This is basically re-ranking the results by the aggregator, which is useful for embodiments where different search servers run different search algorithms and thus generate scores on different scales that are not inter-compatible. Additionally, the aggregator can assign the new numerical score to only those results that were found using a different algorithm, so as to bring all numerical scores assigned to results on a single scale. While merging the results, the aggregator can remove duplicate results which can come up from different servers that have overlapping data. After merging the results, the aggregator can truncate the list of results before forwarding it to the device that generated the search request. The merged list of results can be sent back to the device that generated the search request (in the case where this device is not the aggregator), and the merged list of results can be shown to the user and can indicate, for each result, the server from which it comes and a direct link to access the item associated with the result (e.g., document, image, etc.).

It should also be noted that an artificial intelligence (AI) component can facilitate automating one or more features in accordance with the disclosed aspects. A memory and a processor as well as other components can include functionality with regard to the figures. The disclosed aspects in connection with facilitating server extension can employ various AI-based schemes for carrying out various aspects thereof. For example, a process for detecting one or more trigger events, reducing a number of results as a result of the one or more trigger events, and modifying one or more reported results, and so forth, can be facilitated with an example automatic classifier system and process. In another example, a process for penalizing one search result while preferring another search result can be facilitated with the example automatic classifier system and process.

An example classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that can be automatically performed.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to modifying a transmit power, modifying one or more reported mobility measurements, and so forth. The criteria can include, but is not limited to, predefined values, frequency attenuation tables or other parameters, service provider preferences and/or policies, and so on.

In one embodiment, described herein is a method comprising receiving, by a first server comprising a processor from a user equipment, search request data representative of a search request for retrieving a document in accordance with a query, wherein the search request data comprises user equipment identification data that identifies the user equipment. The method can comprise modifying, by the first server, the search request data, resulting in modified search request data, wherein the modified search request data comprises destination data representative of servers for the modified search request data to be sent based on the user equipment identification data and a configuration of the first server, and wherein modifying the search request data comprises modifying text data to vector data generated by a neural network shared by the first server, a second server, and a third server. In response to modifying the search request data, the method can comprise sending, by the first server, the modified search request data to the second server and the third server. The method can comprise receiving, by the first server, first search results and first ranking data from the second server and second search results and second ranking data from the third server. In response to receiving the first search results the second search results, the method can comprise aggregating, by the first server, the first search results and the second search results based on the first ranking data and the second ranking data, resulting in aggregated search results. Based on relationship between the aggregated search results, the method can comprise reducing, by the first server, the aggregated search results to a limited number of the aggregated search results. Additionally, the method can comprise populating, by the first server, an information disclosure form with the limited number of the results. Furthermore, in response to populating the information disclosure form, the method can comprise sending, by the first server, the information disclosure form to the user equipment.

According to another embodiment, a system can facilitate, receiving, from a user equipment, search request data representative of a search request for a document to be associated with a query, wherein the search request data comprises user equipment identification data that identifies the user equipment. In response to receiving the search request data, the system can comprise modifying the search request data, resulting in modified search request data, wherein the modified search request data comprises destination data representative of servers for the modified search request data to be sent, and wherein the modified search request data comprises language translation data to facilitate the servers searching via a different language than a language of the search request. In response to modifying the search request data and based on a permission status of the user equipment, the system can comprise sending the modified search request data to a first server of the servers. In response to sending the modified search request data to the first server, the system can comprise receiving first search results and a first rank value associated with the first search results from the first server. The system can comprise receiving second search results and a second rank value associated with the second search results from a second server. In response to receiving the first search results and the second search results, the system can comprise aggregating the first search results and the second search results based on the first rank value and the second rank value, resulting in aggregated search results. Based on relationship between the first search results and the second search results, the system can comprise reducing, by the first server, the aggregated search results to reduced search results. In response to reducing the aggregated search results, the system can comprise populating an information disclosure form with the reduce search results. Furthermore, in response to populating the information disclosure form, the system can comprise transmitting the information disclosure form to the user equipment.

According to yet another embodiment, described herein is a machine-readable medium that can perform the operations comprising receiving, from a user equipment, search request data representative of a search request to be performed, wherein the search request data comprises user equipment identification data indicative of the user equipment. In response to receiving the search request data, the machine-readable medium can perform the operations comprising altering the search request data, resulting in altered search request data, wherein the altered search request data comprises destination data representative of a first server for the altered search request data to be sent, vector data generated by a neural network shared by the first server and a second server, and language translation data to facilitate the first server and the second server searching via a different language than a language of the search request. In response to altering the search request data and based on a permission status of the user equipment, the machine-readable medium can perform the operations comprising sending the altered search request data to the first server and the second server. In response to sending the altered search request data to the first server and the second server, the machine-readable medium can perform the operations comprising receiving a first search result and a rank value of the first search result from the first server and a second search result and a second rank value of the second search result from the second server. In response to receiving the first search result and the second search result, the machine-readable medium can perform the operations comprising combining the first search result and the second search result based on the first rank value and the second rank value, resulting in combined search results. Based on relationship between the combined search results, the machine-readable medium can perform the operations comprising reducing the combined search results to a reduced search result less than the combined search result. Additionally, the machine-readable medium can perform the operations comprising populating an information disclosure statement form with the reduced result. Furthermore, in response to populating the information disclosure statement form, the machine-readable medium can perform the operations comprising sending the information disclosure statement form to the user equipment.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can include one or more user equipment UEs 102. The non-limiting term user equipment can refer to any type of device that can communicate with a network node in a cellular or mobile communication system. A UE can have one or more antenna panels having vertical and horizontal elements. Examples of a UE include a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also include IOT devices that communicate wirelessly.

In various embodiments, system 100 is or includes a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can include a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud-based networks, and the like. For example, in at least one implementation, system 100 can be or include a large-scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can include wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide wireless networking features and functionalities. For example, in addition to the various types of data communication between conventional UEs (e.g., phones, smartphones, tablets, PCs, televisions, Internet enabled televisions, etc.) supported by 4G networks, 5G and 6G networks can be employed to support data communication between smart cars in association with driverless car environments, as well as machine type communications (MTCs). Considering the drastic different communication demands of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of wireless networks. With waveforms that split the bandwidth into several sub-bands, different types of services can be accommodated in different sub-bands with the most suitable waveform and numerology, leading to an improved spectrum utilization for wireless networks.

To meet the demand for data centric applications, features wireless networks may include: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, wireless networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

Currently, much of the millimeter wave (mmWave) spectrum, the band of spectrum between 30 gigahertz (GHz) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain.

Figure 2:
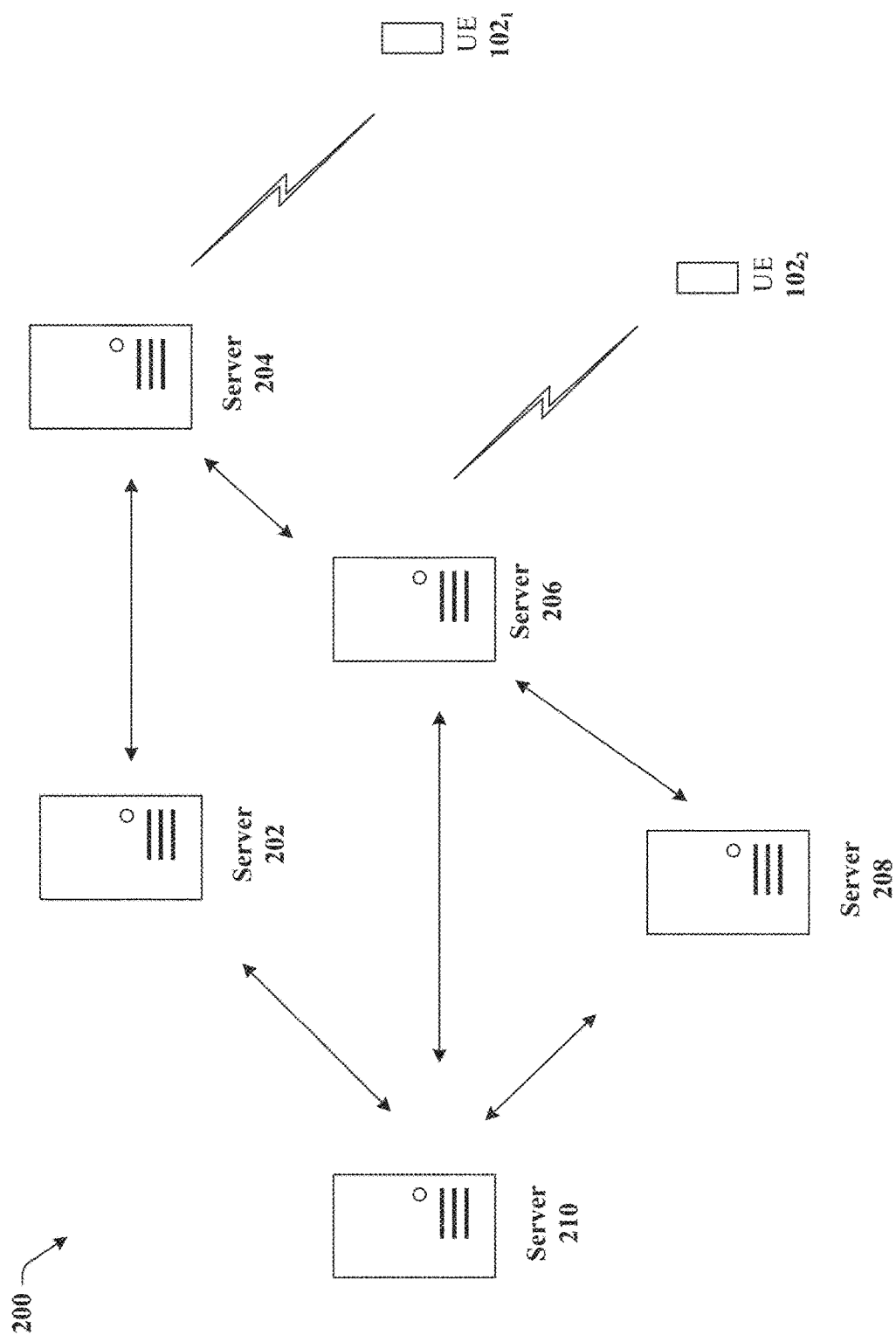
FIG. 2 illustrates an example a patent quality artificial intelligence server system in one or more embodiments.

Referring now to FIG. 2, illustrated is an example a patent quality artificial intelligence server system in one or more embodiments.

The information retrieval (IR) servers 202, 204, 206, 208, 210 can be situated at different locations and carry different data. Thus, the IR servers 202, 204, 206, 208, 210 can be designed such that one can act as an extension of another by accepting search queries from the other server and returning, in response, whatever results it finds from within its own document collection. For example, a query initiated by the UE 1021 can be received by server 206. Server 206 can then forward this query to server 210. Server 210 can then include, in its response to the query, results obtained from its extension (e.g., servers 202 and 208). To the user of UE 1021, the process would be transparent as if all data is available on the server 206. Likewise, a query from UE 1021 can be received by server 204 and be forwarded to server 206 as an extension of server 204. This setting can be useful, for instance, in a corporate setting where a company has its own private document repository tapped by an on-site IR server. When a company's employee enters a query, not only can they see the results from a private, in-house repository but also from a public IR server, which stores all public patent data.

Figure 3:
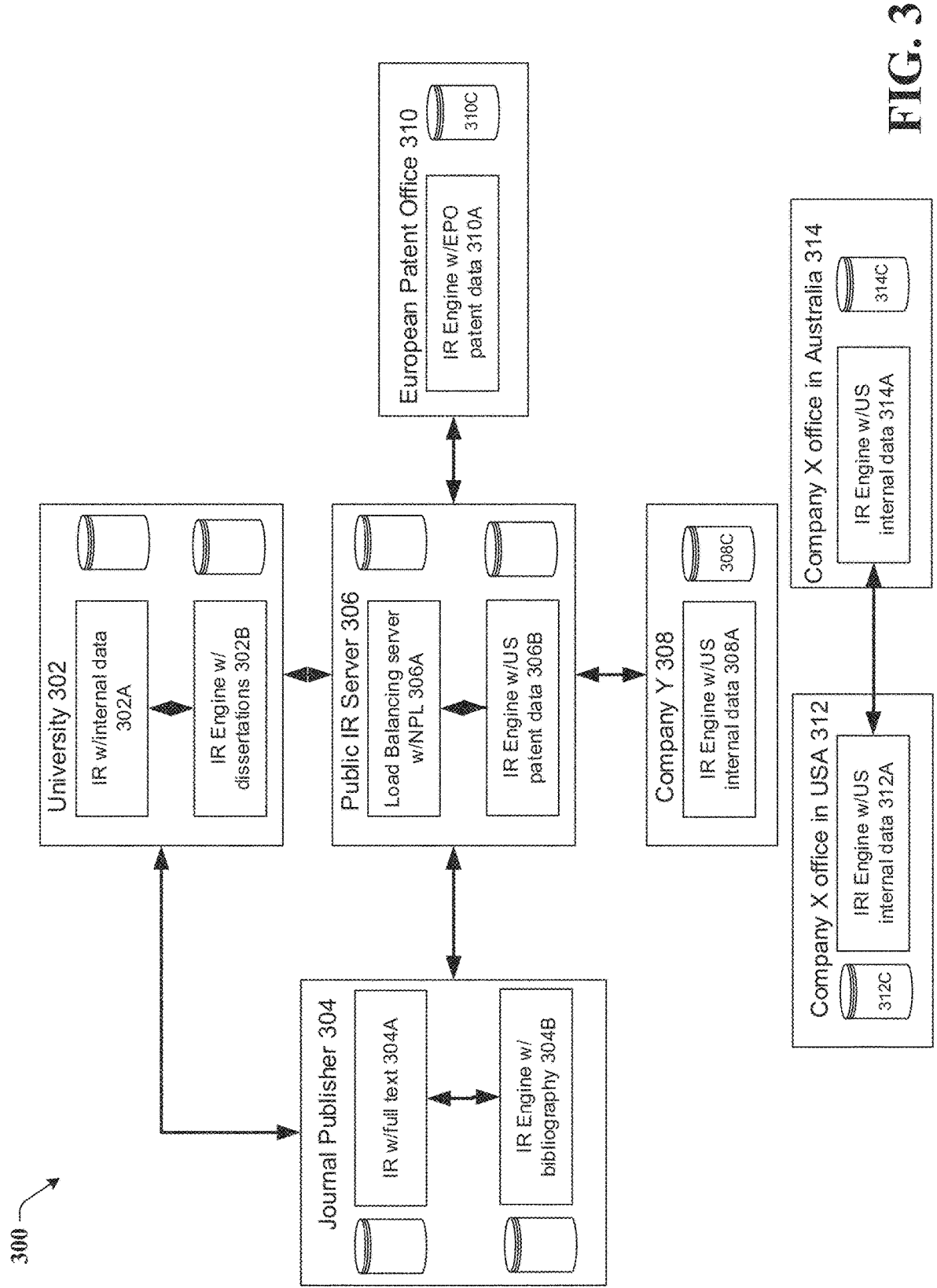
FIG. 3 illustrates an example patent quality artificial intelligence server system according to one or more embodiments.

Referring now to FIG. 3, illustrated an example patent quality artificial intelligence server system according to one or more embodiments.

The IR server system 300 can comprise a public IR server 306, which can host the public patent data. The IR server 306 can also comprise a load balancing server 306A. For example, when there is too much data for the IR server 306 server to handle, the load balancing server 306A can facilitate distribution of the results by allowing the IR server 306 server to offload some results to the load balancing server 306A. Company Y 308 can have an IR server with internal data 308A. If the company Y 308 has linked its internal data 308A to the public IR server 306, when the company Y 308 runs a patent query, the patent query can search the internal database 308A and the public IR server patent data 306B. The results can be aggregated and ranked by the private search engine of company Y 308. It should also be noted that various results can be aggregated at any of the servers depending on relationships (e.g., public vs. private) between servers and/or privileges given to specific servers. The European Patent Office 310 can also transmit its search results via the IR server 310A the public IR server 306. Thus, if there is a request from Company Y 308 for European patent data, this data can be aggregated with other requested search results. Another public database of a journal publisher 304 can share information (e.g., published journals) with the public IR server 306 via an IR server 304B that comprises bibliographic data. Alternatively, or in addition to the IR engine 304B, the journal publisher 304 can comprise another IR engine 304A that comprises full journal text. The journal text can be provided to an entity (e.g., university 302) via a paid subscription or fee. The university 302 can also have a public search engine 302B of its own, which can comprise PhD dissertations or other information that the university 302 would like to share publicly. Thus, the university data 302 can share its public data with the public IR server 306.

One use of the illustrated system would be for scaling, where the data is too much for one server. Another use could be to link two ever-evolving data repositories located on geographically distant servers. For example, a company X office in the U.S. 312 and the company X Australia office 314, can be searched simultaneously using the IR server system 300. It would also be possible to connect together a number of such data repositories. For example, all open-access research journal publishers, so that a single query can be made to 'propagate' on the network and the queried IR server collates all the results together and return to the user. The IR server system 300 would obviate the need to collate data from multiple publishers in one place. This is advantageous for cases where new documents are pushed to the repositories frequently. It would also be possible for patent offices to have deployed their own IR servers and make their data accessible worldwide in real-time.

Referring now to FIG. 4, illustrated is a patent quality artificial intelligence server system in one or more embodiments.

The patent quality artificial intelligence server system 400, can facilitate a search request from the UE 102 can be forwarded from server 402 to server 404. The server 402 can modify the search request by changing the representation of the query it contains. For example, the server 402 can change the representation of the query from text to a vector. It can also change the search filters. The server 402 can also remove some information from the search request. For instance, if the query contains a full invention description, the server 402 can remove part of it through omission of some of the explicit information or creating a shortened summary that omits some of the details of the invention. The server 402 can change the modality of the query. For instance, if the query contains an image uploaded by the UE 102 for a design search, the server 402 can replace the image with a piece of text that describes the design (e.g., replace the image of a water bottle with the textual phrase 'water bottle'). The text could be generated directly by identifying the objects in the images or by processing of the metadata (e.g. subtitles) associated with the similar images in the first search server's database. The server 402 can add additional information in the search request before forwarding it (as a forwarded search request) to the server 404. The additional info can specify the destination to which the server 404 should return the search results. The destination could be the server 402 itself, the UE 102, or it could even be another server (not illustrated). The additional info can identify specific search algorithms (e.g., machine learning models) and their versions that should be used for serving to this search request. Thus, the server 404 can use the specified algorithms while searching.

Referring now to FIG. 5, illustrated is an example schematic system block diagram of a server architecture according to one or more embodiments.

The server architecture 500 can comprise servers 502, 504, 506, 508. Within this architecture, one server can be designated as an aggregator server. For example, if server 504 sends out a query in response to receiving a query request from the UE 102, and the server 502 is designated as an aggregate server, servers 504, 506, 508 can transmit back their respective responses containing search results to the server 502 (e.g., the aggregator server). The server 502 can be specified as the aggregate server in the search request to server 504, but if not, the results can be sent back to the same server (e.g., server 404 or the originating UE 102 in case it is considered to be the first search server) from which the search request was obtained. It should be noted that the aggregator server 402 can also be the device that made the original search request (e.g., UE 102).

The aggregator server 502 can merge the results received from servers 504, 506, 508. For example, the aggregator can merge the results on the basis of numerical scores generated by individual servers 504, 506, 508, associated with the results, (e.g., ascending or descending) and/or the aggregator can merge the results on the basis of a new numerical score calculated by the aggregator, by using a search algorithm different from one or more of the algorithms used by the search servers 504, 506, 508 for obtaining the results. This can be a re-ranking of the results by the aggregator, which is useful for embodiments where different search servers run very different search algorithms. It should be noted that one or more of the servers 502, 504, 506, 508 can be public or private servers. For example, if server 502 is a private server, then the UE $102_1$ can have access privileges to the server 502 that the UE $102_2$ does not have. In some cases, this may not preclude UE $102_2$ from receiving a query result from server 506 that includes results received from the server 502, via server-to-server communication, if there is an indication or agreement that private data from server 502 can be queried by server 506 even if the UE $102_2$ does not have direct access to perform such a query directly with server 502. However, in other cases, server 506 can indeed be precluded from querying server 502 based on the server 502 being a private server.

Additionally, the aggregator server 502 can assign the new numerical score to only those results that were found using a different algorithm, so as to bring all numerical scores assigned to results on a single scale. While merging the results, the aggregator server 502 can remove duplicate results that came from servers 504, 506, 508 that have overlapping data. After merging the results, the server 502 can truncate the list of results before forwarding it to the UE $102_1$ that generated the search request. The merged list of results can be sent back to the device (e.g., UE $102_1$) that generated the search request (in the case where this device is not the aggregator), and the merged list of results can be shown to the user and can indicate, for each result. The aggregator server 502 can also append the information with the server identification from which the results were received and append a direct link to access the item associated with the result (e.g., document, image, etc.). In the scenario where the result came from a server that is a private server, and the requestor has been given access to the information based on some pre-arranged agreement, then the aggregator server can generate a temporary link to the information on the private server that will expire according to criteria set forth in the agreement (e.g., access for a specific time duration, access between certain times of the day, week, month, or year, access based a requestor identification, etc.).

Referring now to FIG. 6, illustrated is an example flow diagram for method for a server extension system according to one or more embodiments.

At element 600, the method can comprise receiving, receiving, by a first server comprising a processor from a user equipment, search request data representative of a search request for retrieving a document in accordance with a query, wherein the search request data comprises user equipment identification data that identifies the user equipment. At element 602, the method can comprise modifying, by the first server, the search request data, resulting in modified search request data, wherein the modified search request data comprises destination data representative of servers for the modified search request data to be sent based on the user equipment identification data and a configuration of the first server, and wherein modifying the search request data comprises modifying text data to vector data generated by a neural network shared by the first server, a second server, and a third server. In response to modifying the search request data, at element 604, the method can comprise sending, by the first server, the modified search request data to the second server and the third server. At element 606, the method can comprise receiving, by the first server, first search results and first ranking data from the second server and second search results and second ranking data from the third server. In response to receiving the first search results the second search results, at element 608, the method can comprise aggregating, by the first server, the first search results and the second search results based on the first ranking data and the second ranking data, resulting in aggregated search results. Based on relationship between the aggregated search results, at element 610, the method can comprise reducing, by the first server, the aggregated search results to a limited number of the aggregated search results. Additionally, at element 612, the method can comprise populating, by the first server, an information disclosure form with the limited number of the results. Furthermore, at element 614, in response to populating the information disclosure form, the method can comprise sending, by the first server, the information disclosure form to the user equipment.

Referring now to FIG. 7, illustrated is an example flow diagram for a system for server extension system according to one or more embodiments.

At element 700, the system can facilitate receiving, from a user equipment, search request data representative of a search request for a document to be associated with a query, wherein the search request data comprises user equipment identification data that identifies the user equipment. In response to receiving the search request data, at element 702, the system can comprise modifying the search request data, resulting in modified search request data, wherein the modified search request data comprises destination data representative of servers for the modified search request data to be sent, and wherein the modified search request data comprises language translation data to facilitate the servers searching via a different language than a language of the search request. In response to modifying the search request data and based on a permission status of the user equipment, at element 704, the system can comprise sending the modified search request data to a first server of the servers. In response to sending the modified search request data to the first server, at element 706, the system can comprise receiving first search results and a first rank value associated with the first search results from the first server. At element 708, the system can comprise receiving second search results and a second rank value associated with the second search results from a second server. In response to receiving the first search results and the second search results, at element 710, the system can comprise aggregating the first search results and the second search results based on the first rank value and the second rank value, resulting in aggregated search results. Based on relationship between the first search results and the second search results, at element 712, the system can comprise reducing, by the first server, the aggregated search results to reduced search results. In response to reducing the aggregated search results, at element 714, the system can comprise populating an information disclosure form with the reduce search results. Furthermore, at element 716, in response to populating the information disclosure form, the system can comprise transmitting the information disclosure form to the user equipment.

Referring now to FIG. 8, illustrated is an example flow diagram for machine-readable medium for a server extension system according to one or more embodiments.

At element 800, the machine-readable medium that can perform the operations comprising receiving, from a user equipment, search request data representative of a search request to be performed, wherein the search request data comprises user equipment identification data indicative of the user equipment. In response to receiving the search request data, at element 802, the machine-readable medium can perform the operations comprising altering the search request data, resulting in altered search request data, wherein the altered search request data comprises destination data representative of a first server for the altered search request data to be sent, vector data generated by a neural network shared by the first server and a second server, and language translation data to facilitate the first server and the second server searching via a different language than a language of the search request. In response to altering the search request data and based on a permission status of the user equipment, at element 804, the machine-readable medium can perform the operations comprising sending the altered search request data to the first server and the second server. In response to sending the altered search request data to the first server and the second server, at element 806, the machine-readable medium can perform the operations comprising receiving a first search result and a rank value of the first search result from the first server and a second search result and a second rank value of the second search result from the second server. In response to receiving the first search result and the second search result, at element 808, the machine-readable medium can perform the operations comprising combining the first search result and the second search result based on the first rank value and the second rank value, resulting in combined search results. Based on relationship between the combined search results, at element 810, the machine-readable medium can perform the operations comprising reducing the combined search results to a reduced search result less than the combined search result. Additionally, at element 812, the machine-readable medium can perform the operations comprising populating an information disclosure statement form with the reduced result. Furthermore, at element 814, in response to populating the information disclosure statement form, the machine-readable medium can perform the operations comprising sending the information disclosure statement form to the user equipment.

Figure 9:
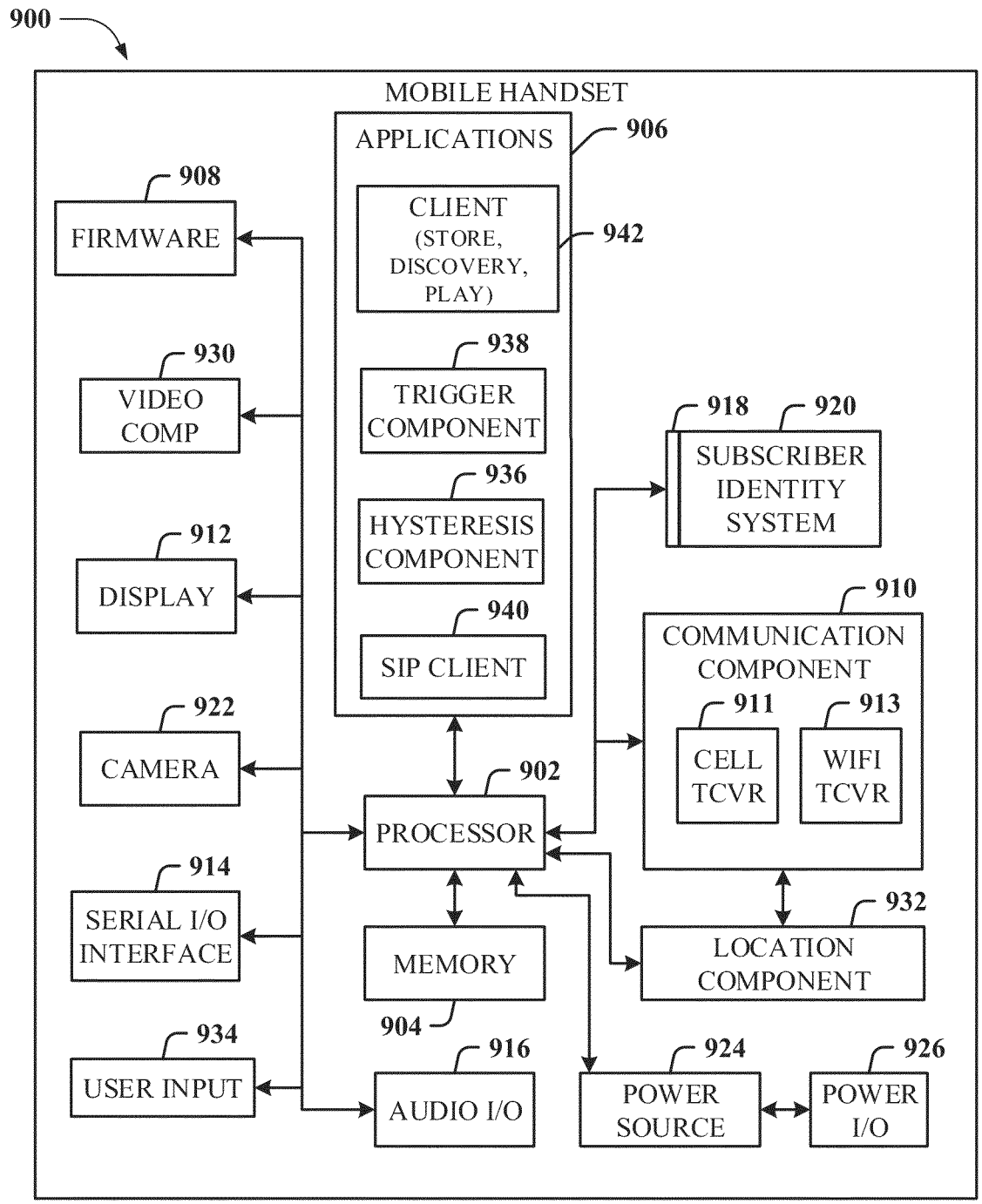
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 99 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
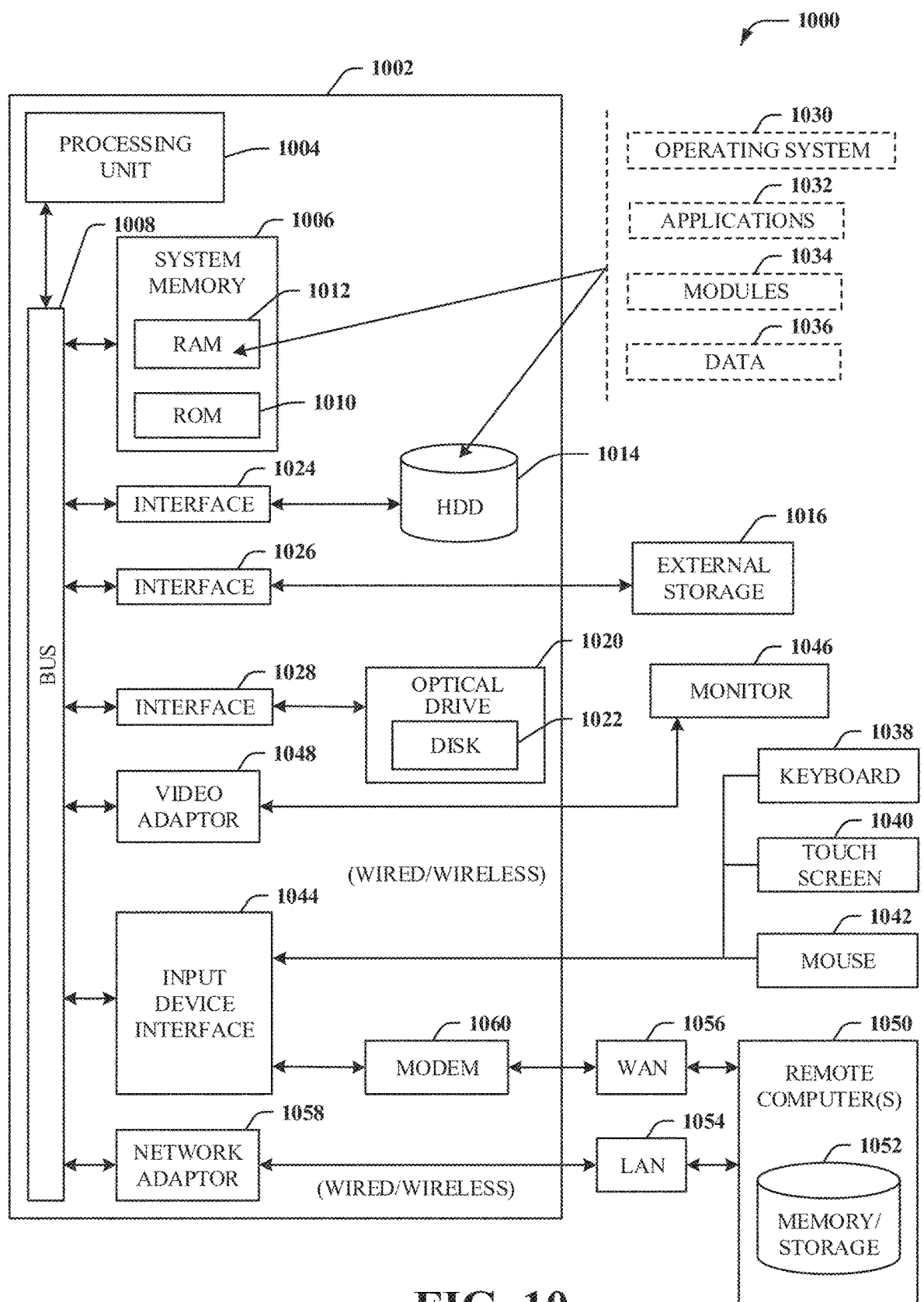
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/ storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a first server comprising a processor from a user equipment, search request data representative of a search request for retrieving a document in accordance with a query, wherein the search request data comprises user equipment identification data that identifies the user equipment;
   modifying, by the first server, the search request data, resulting in modified search request data, wherein the modified search request data comprises destination data representative of servers for the modified search request data to be sent based on the user equipment identification data and a configuration of the first server, and wherein modifying the search request data comprises modifying text data to vector data generated by a neural network shared by the first server, a second server, and a third server;
   in response to modifying the search request data, sending, by the first server, the modified search request data to the second server and the third server;
   receiving, by the first server, first search results and first ranking data from the second server and second search results and second ranking data from the third server;
   in response to receiving the first search results the second search results, aggregating, by the first server, the first search results and the second search results based on the first ranking data and the second ranking data, resulting in aggregated search results;
   based on relationship between the aggregated search results, reducing, by the first server, the aggregated search results to a limited number of the aggregated search results;
   populating, by the first server, an information disclosure form with the limited number of the results; and
   in response to populating the information disclosure form, sending, by the first server, the information disclosure form to the user equipment.

2. The method of claim 1, wherein the search request data further comprises indication data representative of an indication that the search request data is to be sent to the second server.

3. The method of claim 2, wherein the second server is accessible based on a user identity privilege associated with the user equipment.

4. The method of claim 1, wherein modifying the search request data further comprises omitting text data from the search request data.

5. The method of claim 1, wherein modifying the search request data further comprises replacing an image with text data that describes the image.

6. The method of claim 1, wherein the modified search request data further comprises machine-learning model data representative of a machine-learning model to be utilized by the second server.

7. The method of claim 1, wherein the destination data comprises an indication that the modified search request data is to be sent from the second server to the third server.

8. A system, comprising:
a processor; and
a memory that stores executable instructions that, when executed by the processor, facilitate performance of operations, comprising:
receiving, from a user equipment, search request data representative of a search request for a document to be associated with a query, wherein the search request data comprises user equipment identification data that identifies the user equipment;
in response to receiving the search request data, modifying the search request data, resulting in modified search request data, wherein the modified search request data comprises destination data representative of servers for the modified search request data to be sent, and wherein the modified search request data comprises language translation data to facilitate the servers searching via a different language than a language of the search request;
in response to modifying the search request data and based on a permission status of the user equipment, sending the modified search request data to a first server of the servers;
in response to sending the modified search request data to the first server, receiving first search results and a first rank value associated with the first search results from the first server;
receiving second search results and a second rank value associated with the second search results from a second server;
in response to receiving the first search results and the second search results, aggregating the first search results and the second search results based on the first rank value and the second rank value, resulting in aggregated search results;
based on relationship between the first search results and the second search results, reducing, by the first server, the aggregated search results to reduced search results;
in response to reducing the aggregated search results, populating an information disclosure form with the reduce search results; and
in response to populating the information disclosure form, transmitting the information disclosure form to the user equipment.

9. The system of claim 8, wherein the operations further comprise:
receiving indication data representative of an indication that the first server has permission to send the modified search request data to the second server.

10. The system of claim 9, wherein the second server is a private server.

11. The system of claim 8, wherein the first search result comprises relevancy data indicative of a relevancy of the first search result to the query.

12. The system of claim 8, wherein the operations further comprise:
receiving server identification data representative of an identification of a server that has sent a search result.

13. The system of claim 8, wherein the operations further comprise:
generating destination data representative of a destination server for which the first search result is to be sent.

14. The system of claim 13, wherein the operations further comprise:
in response to generating the destination data, sending the destination data to the first server.

15. A non-transitory machine-readable medium, comprising executable instructions that, when executed by a processor, facilitate performance of operations, comprising:
receiving, from a user equipment, search request data representative of a search request to be performed, wherein the search request data comprises user equipment identification data indicative of the user equipment;
in response to receiving the search request data, altering the search request data, resulting in altered search request data, wherein the altered search request data comprises destination data representative of a first server for the altered search request data to be sent, vector data generated by a neural network shared by the first server and a second server, and language translation data to facilitate the first server and the second server searching via a different language than a language of the search request;
in response to altering the search request data and based on a permission status of the user equipment, sending the altered search request data to the first server and the second server;
in response to sending the altered search request data to the first server and the second server, receiving a first search result and a rank value of the first search result from the first server and a second search result and a second rank value of the second search result from the second server;
in response to receiving the first search result and the second search result, combining the first search result and the second search result based on the first rank value and the second rank value, resulting in combined search results;
based on relationship between the combined search results, reducing the combined search results to a reduced search result less than the combined search result;
populating an information disclosure statement form with the reduced result; and
in response to populating the information disclosure statement form, sending the information disclosure statement form to the user equipment.

16. The non-transitory machine-readable medium of claim 15, wherein the operations further comprise:
in response to combining the first search result and the second search result, removing duplicate results that occur between the first search result and the second search result.

17. The non-transitory machine-readable medium of claim 16, wherein the operations further comprise:
sending forwarding data, indicative of a third server to use for the altered search request data to be sent, to the second server.

18. The non-transitory machine-readable medium of claim 17, wherein the operations further comprise:
generating destination data, representative of a destination, for a third search result to be transmitted.

19. The non-transitory machine-readable medium of claim 18, wherein the operations further comprise:

in response to generating the destination data, sending the destination data to the second server to be sent to the third server.

20. The non-transitory machine-readable medium of claim 19, wherein the destination data comprises an indication that the third search result is to be sent from the third server to the user equipment.

\* \* \* \* \*